United States Patent
Guhl et al.

(10) Patent No.: US 7,293,391 B2
(45) Date of Patent: *Nov. 13, 2007

(54) UNITARY INSULATED GLASS UNIT WITH VAPOR BARRIER

(75) Inventors: James Curtis Guhl, Hudson, WI (US); Steven Matthew Johnson, Minneapolis, MN (US); Neil Ranger Fredrick, Hudson, WI (US)

(73) Assignee: Andersen Corporation, Bayport, MN (US)

( * ) Notice: Subject to any disclaimer, the term of this patent is extended or adjusted under 35 U.S.C. 154(b) by 51 days.

This patent is subject to a terminal disclaimer.

(21) Appl. No.: 11/054,487

(22) Filed: Feb. 9, 2005

(65) Prior Publication Data

US 2005/0132663 A1    Jun. 23, 2005

Related U.S. Application Data

(60) Continuation of application No. 10/271,606, filed on Oct. 15, 2002, now Pat. No. 6,889,480, which is a division of application No. 09/365,014, filed on Aug. 2, 1999, now Pat. No. 6,463,706, which is a division of application No. 08/929,885, filed on Sep. 15, 1997, now Pat. No. 6,055,783.

(51) Int. Cl.
*E06B 3/24* (2006.01)

(52) U.S. Cl. ............... 52/204.593; 52/204.6; 52/786.13; 52/788.1

(58) Field of Classification Search ............ None
See application file for complete search history.

(56) References Cited

U.S. PATENT DOCUMENTS

| | | | |
|---|---|---|---|
| 309,636 A | 12/1884 | Mann | |
| 579,460 A | 3/1897 | Wilbur | |
| 1,605,583 A | 11/1926 | Heymer | |
| 1,703,230 A | 2/1929 | Gillar | |
| 1,853,317 A | 4/1932 | Packer | |
| 2,029,541 A | 2/1936 | Martinson | |
| 2,050,733 A | 8/1936 | Ross | |
| 2,052,244 A | 8/1936 | Pertz | |
| 2,132,217 A | 10/1938 | Neuendorf | |
| 2,219,688 A | 10/1940 | Knudsen | |
| 2,246,075 A | 6/1941 | Phillips et al. | |
| 2,383,691 A | 8/1945 | Smith | |
| 2,551,950 A | 5/1951 | Johnson | |

(Continued)

FOREIGN PATENT DOCUMENTS

CH    370906 A    7/1963

(Continued)

OTHER PUBLICATIONS

Von der Ansicht zur Aussicht sur Einsicht: Das VITRALUX—Fenstersystem: Weniger ist mehr. Mehr Sicht, mehr Licht (6 pgs.), date unknown.

*Primary Examiner*—Robert Canfield
(74) *Attorney, Agent, or Firm*—Womble Carlyle Sandridge & Rice, PLLC (57) ABSTRACT

A multi-paned fenestration unit in which the glass panes are manufactured directly into the support structure without first manufacturing an insulated glass unit. The support structure is designed to provide the structural support for the glass panes without a separate spacer.

13 Claims, 6 Drawing Sheets

U.S. PATENT DOCUMENTS

| | | | |
|---|---|---|---|
| 2,607,453 A | 8/1952 | Smith | |
| 2,719,341 A | 10/1955 | Clerk | |
| 2,723,427 A | 11/1955 | Bobel | |
| 3,008,196 A | 11/1961 | Springer et al. | |
| 3,070,854 A | 1/1963 | Thode | |
| 3,203,053 A | 8/1965 | Lane et al. | |
| 3,393,486 A | 7/1968 | Pasche | |
| 3,573,149 A | 3/1971 | Tibble et al. | |
| 3,881,290 A | 5/1975 | Bouchey | |
| 3,919,023 A | 11/1975 | Bowser et al. | |
| 3,971,178 A | 7/1976 | Mazzoni et al. | |
| 4,015,394 A | 4/1977 | Kessler | |
| 4,027,443 A | 6/1977 | Briggs | |
| 4,080,482 A * | 3/1978 | Lacombe | 428/34 |
| 4,109,432 A | 8/1978 | Pilz | |
| 4,121,394 A | 10/1978 | Brooks | |
| 4,151,696 A | 5/1979 | Knights et al. | |
| 4,158,278 A | 6/1979 | Cardinale et al. | |
| 4,171,601 A * | 10/1979 | Gotz | 52/786.13 |
| 4,208,849 A | 6/1980 | Lamb | |
| 4,259,135 A | 3/1981 | Kulla | |
| 4,294,733 A | 10/1981 | Marzouki et al. | |
| 4,305,982 A | 12/1981 | Hirsch | |
| 4,334,398 A * | 6/1982 | Grether | 52/786.11 |
| 4,372,094 A | 2/1983 | Boschetti | |
| 4,394,806 A | 7/1983 | Day | |
| 4,407,105 A | 10/1983 | Frank | |
| 4,416,101 A | 11/1983 | Derner et al. | |
| 4,454,703 A | 6/1984 | Sitzler et al. | |
| 4,459,789 A | 7/1984 | Ford | |
| 4,464,874 A * | 8/1984 | Shea et al. | 52/204.593 |
| 4,472,914 A | 9/1984 | DeBoef et al. | |
| 4,485,603 A | 12/1984 | Derner et al. | |
| 4,499,703 A | 2/1985 | Rundo | |
| 4,563,843 A * | 1/1986 | Grether et al. | 52/172 |
| 4,615,159 A | 10/1986 | Kessler | |
| 4,669,241 A | 6/1987 | Kelly | |
| 4,680,206 A | 7/1987 | Yoxon et al. | |
| 4,702,050 A | 10/1987 | Giguere | |
| 4,719,728 A | 1/1988 | Eriksson et al. | |
| 4,720,950 A * | 1/1988 | Bayer et al. | 52/172 |
| 4,793,107 A | 12/1988 | Pacca | |
| 4,822,649 A | 4/1989 | Canaud et al. | |
| 4,856,243 A | 8/1989 | Ault et al. | |
| 4,873,803 A | 10/1989 | Rundo | |
| 4,909,875 A | 3/1990 | Canaud et al. | |
| 4,984,402 A | 1/1991 | Davies | |
| 5,033,249 A | 7/1991 | Scheeren et al. | |
| 5,061,531 A | 10/1991 | Catalano | |
| 5,106,663 A | 4/1992 | Box | |
| 5,107,643 A | 4/1992 | Swensen | |
| 5,125,195 A | 6/1992 | Brede | |
| 5,131,194 A | 7/1992 | Anderson | |
| 5,286,537 A | 2/1994 | Oita et al. | |
| 5,302,425 A | 4/1994 | Taylor | |
| 5,339,583 A | 8/1994 | Hrdlicka et al. | |
| 5,405,680 A | 4/1995 | Chang et al. | |
| 5,415,909 A | 5/1995 | Shohi et al. | |
| 5,494,715 A | 2/1996 | Glover | |
| 5,497,586 A | 3/1996 | Dodd et al. | |
| 5,503,884 A | 4/1996 | Meyer et al. | |
| 5,509,984 A | 4/1996 | Meyer et al. | |
| 5,510,416 A | 4/1996 | Meyer et al. | |
| 5,512,341 A | 4/1996 | Newby et al. | |
| 5,622,017 A | 4/1997 | Lynn et al. | |
| 5,636,484 A | 6/1997 | DeBlock | |
| 5,640,828 A | 6/1997 | Reeves et al. | |
| 5,653,073 A | 8/1997 | Palmer | |
| 5,657,579 A | 8/1997 | Bruchu et al. | |
| 5,770,321 A | 6/1998 | Hartig et al. | |
| 5,778,629 A | 7/1998 | Howes | |
| 5,851,609 A | 12/1998 | Baratuci et al. | |
| 5,910,083 A | 6/1999 | Richardson et al. | |
| 5,948,505 A | 9/1999 | Puppin | |
| 5,962,090 A * | 10/1999 | Trautz | 428/34 |
| 6,055,783 A | 5/2000 | Guhl et al. | |
| 6,101,783 A | 8/2000 | Howes | |
| 6,209,272 B1 | 4/2001 | Holzaepfel | |
| 6,210,507 B1 | 4/2001 | Hansen et al. | |
| 6,216,417 B1 | 4/2001 | Morin et al. | |
| 6,286,288 B1 | 9/2001 | France | |
| 6,463,706 B1 | 10/2002 | Guhl et al. | |
| 6,509,071 B1 * | 1/2003 | Emek | 428/34 |
| 6,684,598 B1 * | 2/2004 | Fostervold | 52/786.13 |
| 6,737,129 B2 * | 5/2004 | Bayer | 428/34 |
| 6,889,480 B2 * | 5/2005 | Guhl et al. | 52/786.1 |
| 2004/0231255 A1 * | 11/2004 | Silverman | 52/204.6 |

FOREIGN PATENT DOCUMENTS

| | | |
|---|---|---|
| DE | 218645 A | 2/1910 |
| DE | 965664 A | 6/1957 |
| DE | 1509552 A | 2/1969 |
| DE | 2723283 A1 | 4/1979 |
| DE | 2809682 A1 | 9/1979 |
| DE | 2923915 A1 | 4/1981 |
| DE | 3148345 A1 | 6/1983 |
| DE | 35 43 524 A1 * | 12/1985 |
| EP | 291539 A1 | 11/1988 |
| EP | 0892141 A2 | 1/1999 |
| EP | 0521922 B1 | 8/1999 |
| EP | 1 052 362 A2 * | 11/2000 |
| EP | 1055795 A2 | 11/2000 |
| FR | 2518158 A1 | 6/1973 |
| FR | 2624545 A1 | 6/1989 |
| FR | 2648178 A1 | 12/1990 |
| FR | 2708030 A1 | 1/1995 |
| GB | 2254358 A | 10/1992 |
| GB | 2283778 A | 5/1995 |
| GB | 2335223 A | 9/1999 |
| GB | 2340078 A | 2/2000 |
| GB | 2351313 A | 12/2000 |
| GB | 2352755 A | 2/2001 |
| IT | 628775 | 11/1961 |
| SE | 115664 | 1/1946 |

* cited by examiner

UNITARY INSULATED GLASS UNIT WITH VAPOR BARRIER

RELATED APPLICATIONS

This application is a continuation of U.S. patent application Ser. No. 10/271,606, filed Oct. 15, 2002 now U.S. Pat. No. 6,889,480, which is a divisional of U.S. patent application Ser. No. 09/365,014, filed Aug. 2, 1999, now U.S. Pat. No. 6,463,706, which is a divisional of application Ser. No. 08/929,885, filed Sep. 15, 1997, now U.S. Pat. No. 6,055,783, the contents of which are incorporated herein by reference as if fully stated in entirety.

BACKGROUND OF THE INVENTION

1. Field of the Invention

This invention relates generally to a fenestration unit which does not include an insulated glass unit (IGU). More specifically, the glass panes are placed directly into the sash without first being permanently fastened to each other by a spacer. This invention also includes a method for manufacturing a fenestration unit without the utilization of an IGU.

2. Description of the Prior Art

Early fenestration units, including windows and doors, only had a single pane of glass. Typically, the glass would be placed in the sash and then a glazing material would be applied to hold the glass into the sash. However, in more recent times, two or more panes of glass have been utilized in windows for better insulating value. A gap between any two glass panes creates further insulation. The prior art teaches the use of a separate spacer between the two glass panes to create such a gap and to structurally support the two panes of glass.

Figure 1:
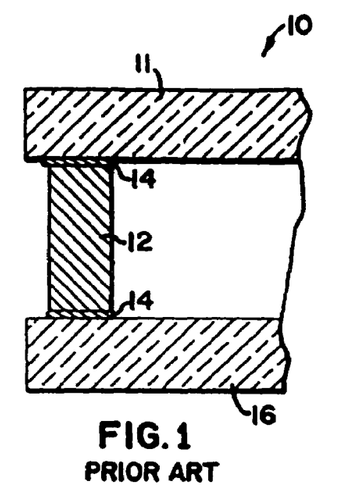
FIG. 1 is a cross-sectional view of a prior art IGU.

FIG. 1 illustrates a typical IGU 10 of the prior art. A first glass pane 11 is sealed to one end of spacer 12 with a sealant 14, and a second glass pane 16 is sealed to the other end of spacer 12 with sealant 14. The spacer 12 can be of many different shapes but often it is made with a jagged edge as shown in FIG. 1 to reduce the conductance of heat through the spacer. This combination of two or more glass panes separated by a spacer is manufactured as a unit (IGU 10) and then later placed into the sash of the fenestration unit.

Figure 2:
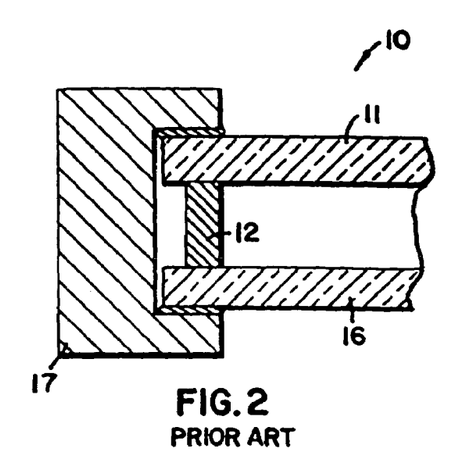
FIG. 2 is a cross-sectional view of an IGU of the prior art inserted into a sash.

FIG. 2 illustrates the IGU 10 after it has been placed in the sash 17 of a fenestration unit.

The prior art fenestration units have a number of problems. Manufacturing involves two operations in which the first operation is manufacturing the IGU and the second operation is placing the IGU in the sash. This dual operation process incorporates significant cost into the fenestration unit. Additionally, this dual operation process typically involves shipping glass from the glass factory to the window manufacturer in the form of an IGU. Such shipping involves greater cost because the IGU's take up more space and they are easier to break than individual glass panes. Additionally, despite efforts to minimize thermal conductivity through the spacer 12, there continues to be significant heat loss through the spacer 12.

SUMMARY OF THE INVENTION

The invention has as its object manufacturing a fenestration unit in one operation wherein the glass panes are placed directly into the sash without the first operation of manufacturing an IGU. The sash (also referred to as the "support structure") of the fenestration unit of this invention provides all of the structural support for the glass panes without the use of an IGU. In other words, the support of the glass panes is an integral part of the sash.

The invention provides a method of manufacturing a fenestration unit including the steps of constructing a support structure including a first receiving surface and a second receiving surface, placing a vapor barrier in contact with the first receiving surface and in contact with the second receiving surface, depositing a first primary sealant on a portion of the vapor barrier in contact with the first receiving surface, depositing a second primary sealant on a portion of the vapor barrier in contact with the second receiving surface, placing a first glass pane onto the first primary sealant on the first receiving surface, placing a second glass pane onto the second primary sealant on the second receiving surface, depositing a first secondary sealant between the first glass pane and the first receiving surface, where the first glass pane is structurally supported by the first receiving surface, and depositing a second secondary sealant between the second glass pane and the second receiving surface, where the second glass pane is structurally supported by the second receiving surface.

The invention also includes a fenestration unit comprising a first glass pane and a second glass pane. Both glass panes have an inside surface and an outside surface such that the inside surfaces face each other. The fenestration unit also includes a support structure having a first receiving surface and a second receiving surface. The first receiving surface of the sash receives the inside and outside surfaces of the first glass pane and the second receiving surface receives the inside and the outside surfaces of the second glass pane. The fenestration unit also includes a vapor barrier placed in contact with the first receiving surface and the second receiving surface.

The invention further provides a method of manufacturing a fenestration unit including the steps of constructing support structure members where each support structure member has a first receiving surface, a second receiving surface, a first end, and a second end. The method also includes the steps of depositing a first secondary sealant on the first receiving surfaces of each of the support structure members, depositing a second secondary sealant on the second receiving surfaces of each of the plurality of support structure members, positioning first and second glass panes on the first and second receiving surfaces, respectively, and fastening the ends of the support structure members to each other. This method forms a support structure around the first and second glass panes where the first receiving surface contacts the inside surface of the first glass pane and the second receiving surface contacts the inside surface of the second glass pane.

DETAILED DESCRIPTION OF THE PREFERRED EMBODIMENTS

In the following description of the preferred embodiment, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 3:
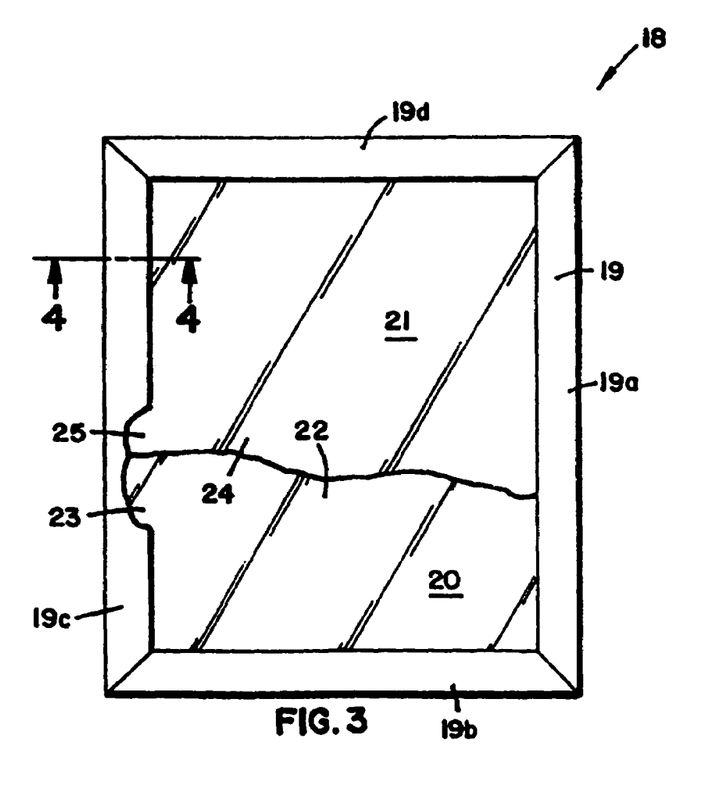
FIG. 3 is a frontal view of the fenestration unit of the invention including a partial cut-away.

FIG. 3 generally illustrates a fenestration unit 18 of the invention. The fenestration unit 18 includes a sash 19 which could also be a window or door frame. The use of the term "sash" is not intended to be limited to a strict sense of the word, but instead is defined as any structure that supports or holds a transparent material such as a glass pane. Therefore, the term "sash" will be used throughout this detailed description of the preferred embodiments, but it is understood to include a typical sash as well as any suitable support structure. The sash 19 includes four sash members 19a, 19b, 19c and 19d and is rectangular in shape. However, the sash members do not have to be lineal and the sash 19 could be any shape. Construction of the sash 19 involves constructing the sash members 19a-d and then fastening the sash members 19a-d together to create the sash 19. The sash members 19a-d can be constructed by extrusion, wood milling or any other suitable manufacturing technique. The four sash members 19a-d can be fastened together in any manner known in the art. For example, depending on the type of material used for the sash 19, the lineal sash members 19a-d could be connected together by an additional piece of connecting hardware, by vibratory welding, by temporary insertion of a heat plate between two adjacent sash members, or by any other method known in the art.

The sash 19 supports the first glass pane 20 and second glass pane 21. The first glass pane 20 has an inner portion 22 and a border portion 23 (as seen through the cut-away portion of the sash 19). The border portion 23 is the portion around the periphery of the first glass pane 20, i.e., the portion proximate to the sash 19. In a preferred embodiment, the border portion 23 extends from the side 30 of the first glass pane 20 to about one inch from the side 30 in the direction of the interior portion 22 of the first glass pane 20. The inner portion 22 is the portion of the first glass pane 20 which is not part of the border portion 23 and which is therefore a further distance from the sash 19. The second glass pane 21 also has an inner portion 24 and a border portion 25 (also shown in the cut-away portion of the sash 19). The inner portion 24 and the border portion 25 are defined the same as above for the first glass pane 20. The outside surface 26 of the first glass pane 20 faces the outdoors. The outside surface 32 of the second glass pane 21 faces the indoors.

Figure 4:
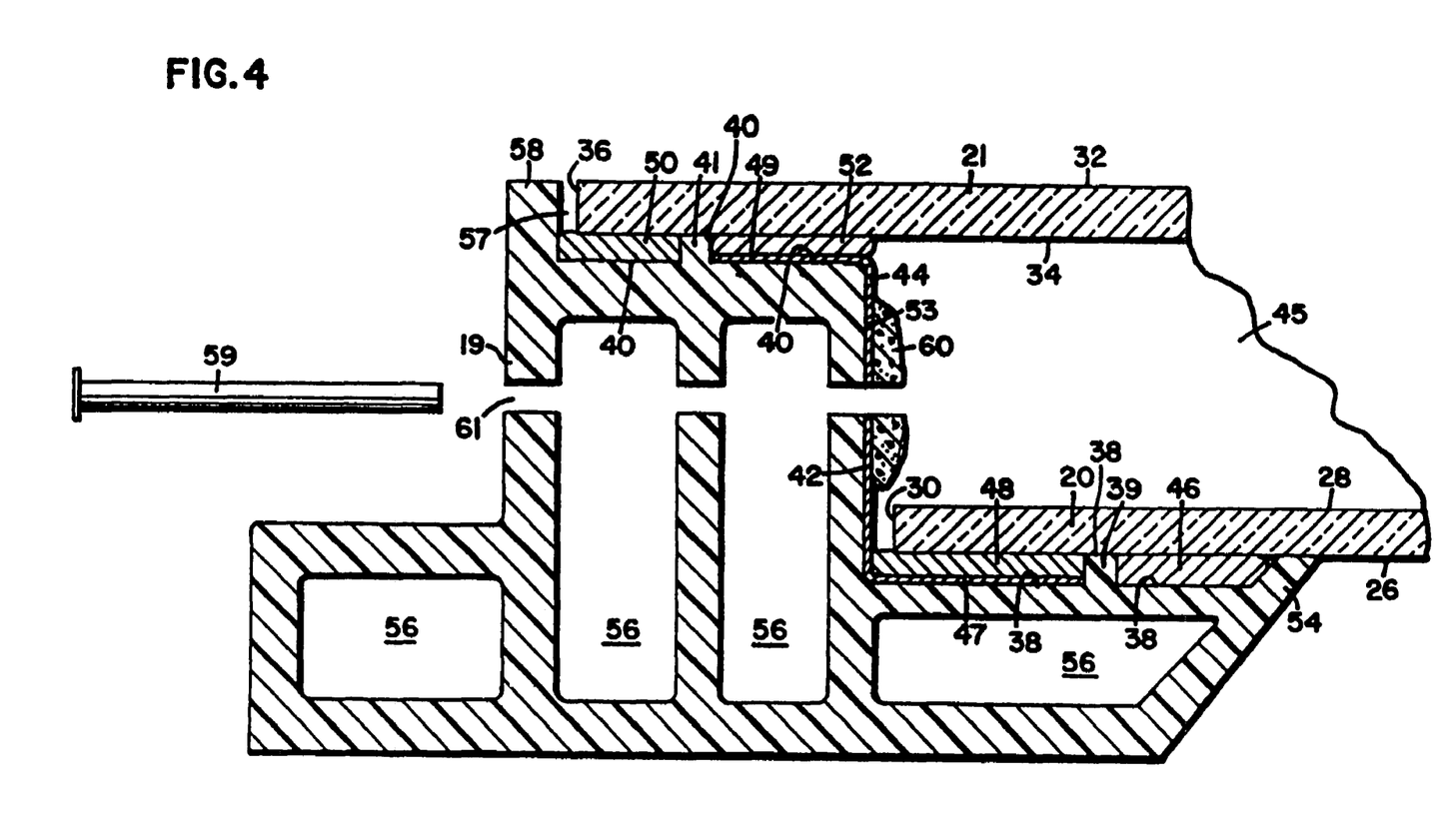
FIG. 4 is a cross-sectional view of a first embodiment of the invention taken along the lines 4-4 of FIG. 3.

FIG. 4 is a cross-sectional view of the first embodiment of the invention taken along the lines 4-4 of FIG. 3. The first glass pane 20 includes an outside surface 26, an inside surface 28 and a side 30. The second glass pane 21 includes an outside surface 32, an inside surface 34 and a side 36.

The sash 19 may be made of any low-thermally conducting material. For example, the sash 19 could be hollow vinyl, hollow thermoplastic, thermoset pultrusion, milled solid wood or wood with a vinyl coating. Alternatively, the sash could be made of Fibrex™ material which is a wood fiber and polyvinyl chloride(PVC) composite patented by Andersen Corporation (See U.S. Pat. Nos. 5,406,768; 5,497,594; 5,441,801; 5,518,677; 5,486,553; 5,539,027).

Figure 5:
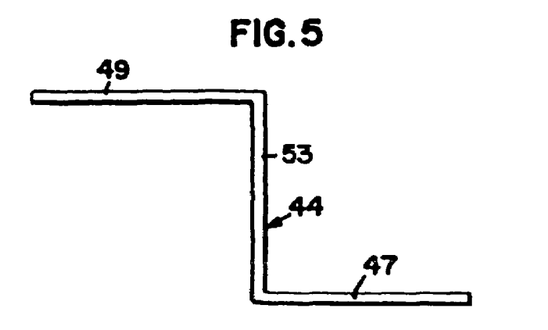
FIG. 5 is a cross sectional view of the anti-outgassing strip of the first embodiment.

The sash 19 includes a first receiving surface 38, a second receiving surface 40 and an interior surface 42. An anti-outgassing strip 44 has a first leg 47 at one end of the anti-outgassing strip 44 and a second leg 49 at the opposite end and an interior portion 53. The interior portion 53 is located between the first leg 47 and the second leg 49. The first leg 47 is attached to the first receiving surface 38, the second leg 49 is attached to the second receiving surface 40 and the interior portion 53 of the anti-outgassing strip 44 is attached to the interior surface 42 of the sash 19. The strip 44 is illustrated in FIGS. 4 and 5. The anti-outgassing strip 44 prevents gas particles in the sash 19 from outgassing into the space 45 between the first glass pane 20 and the second glass pane 21, where these particles could interfere with the clarity of the fenestration unit 18. The anti-outgassing strip 44 is a thin foil of metal but could be any material that prevents the gas particles from the sash 19 from passing through to the space 45. For example, the anti-outgassing strip 44 may be made of stainless steel or aluminum. The anti-outgassing strip 44 is preferably made as thin as possible to reduce the conduction of heat through the strip 44 and yet thick enough to prevent outgassing. A stainless steel anti-outgassing strip 44 must be at least about 0.001" (inches) thick in order to effectively reduce the movement of gas particles from the sash 19 to the space 45. It is sometimes desired to use an anti-outgassing strip 44 that is between about 0.003" (inches) and 0.005" (inches) because such a thickness is easier to apply to the sash 19 without tearing or destroying the anti-outgassing strip 44. It is also within the scope of this invention to apply a metallic spray to the interior surface 42, the first receiving surface 38 and the second receiving surface 40. This metallic spray would then be an anti-outgassing strip. The anti-outgassing strip 44 may be affixed to the sash 19 by an adhesive. Alternatively, the anti-outgassing strip 44 may include barbs 43, as shown in FIGS. 4 and 5, which are pressed into the sash and which hold the anti-outgassing strip 44 to the sash 19. It is also within the scope of this invention to merely place an anti-outgassing strip, without barbs and without an adhesive, on the interior surface 42, the first receiving surface 38 and the second receiving surface 40. Then the sealants and glass panes are placed as shown in FIG. 4 and described below to permanently hold the strip 44 in place.

The various sealants and their functions will now be described. The portion of the outside surface 26 of the border portion 23 of the first glass pane 20 that is not situated over the anti-outgassing strip 44 is attached to the first receiving surface 38 by a first secondary sealant 46. The function of the first secondary sealant 46 is to provide an adhesive bond between the first glass pane 20 and the sash 19. This adhesive bond is structural and prevents the first glass pane 20 from breaking away from the sash 19 in strong winds. The first secondary sealant 46 also prevents water from flowing along the outside surface 26 of the first glass pane 20 and into the space 45. GE 2512 by General Electric Company is used as first secondary sealant 46 but other adhesives known in the art for attaching glass to the sash material may also be used. The portion of the outside surface 26 of the border portion 23 that is situated over the anti-outgassing strip 44 is attached to the anti-outgassing strip 44 by a first primary sealant 48. The function of the first primary sealant 48 is to prevent migration of air or argon or any other insulating gas from the space 45 to the world outside the space 45. The first primary sealant 48 could be any compound that prevents such migration such as, for example, polyisobutylene. The function of the sealant 48 is to prevent gas molecules from moving either into the space 45 or from leaving the space 45. It is within the scope of this invention to use one adhesive/sealant in place of first secondary sealant 46 and first primary sealant 48. The single adhesive would perform a dual function of structurally supporting the glass panes and sealing the space 45.

The portion of the inside surface 34 of the border portion 25 of the second glass pane 21 that is not situated over the anti-outgassing strip 44 is attached to the second receiving surface 40 by a second secondary sealant 50 which is the same as and performs substantially the same function as the first secondary sealant 46. The portion of the inside surface 32 of the border portion 25 of the second glass pane 21 that is situated over the anti-outgassing strip 44 is attached to the anti-outgassing strip 44 by a second primary sealant 52. The second primary sealant 52 is the same as and performs substantially the same function as the first primary sealant 48.

The depositing of the secondary sealants 46 and 50 and the primary sealants 48 and 52 may be accomplished by hand or using a machine. For example, a caulk gun could be used to deposit the various sealants. Robotic machines are also known in the art for depositing sealants in a specified pattern.

The first receiving surface 38 may include a lip 54 which is a portion that is raised from the remainder of the first receiving surface 38. The lip 54 provides a space between the first glass pane 20 and the first receiving surface 38 such that the first secondary sealant 46 and the first primary sealant 48 are not squeezed out from between the first glass pane 20 and the first receiving surface 38, thereby preventing a messy appearance along the interface between the sash 19 and the inner portion 22 of the outside surface 26 of the first glass pane 20.

The sash shown in FIG. 4 defines hollowed portions 56 which allow for a lighter weight sash 19 while retaining structural integrity and excellent insulating properties. However, the invention is not limited to this configuration. A sash defining more or fewer hollowed portions or no hollowed portions or differently shaped hollowed portions would also be within the scope of the invention. For example, if the sash 19 was made of milled wood, then it would not include the hollowed portions 56.

The sash 19 includes a flange 58 adjacent to the side 36 of the second glass pane 21. The flange 58 provides guidance to the proper placement of the second glass pane 21. There is a gap 57 between the end 36 of the second glass pane 21 and the flange 58. The purpose of the gap 57 is to allow the thermal expansion and contraction of the second glass pane 21 and to allow for permanent shrinkage of the sash 19.

The second receiving surface 40 includes a stop 41 which is a portion of the sash which is raised. The stop 41 creates a gap between the second glass pane 21 and the second receiving surface 40 such that the second secondary sealant 50 and the second primary sealant 52 can remain in that gap. The stop 41 is located at the end of the anti-outgassing strip 44 and the stop 41 therefore forms the juncture between the second secondary sealant 50 and the second primary sealant 52. A desiccant material 60 may be attached to the anti-outgassing strip 44 by an adhesive. In the preferred embodiment, the desiccant 60 is an extruded, hot melt adhesive. The desiccant material 60 assists in the removal of moisture from the space 45. The desiccant material 60 could alternatively be an adhesive type desiccant as described in U.S. Pat. Nos. 5,510,416; 5,509,984; and 5,503,884 owned by H.B. Fuller Licensing & Financing, Inc.

The space 45 contains a thermally insulating gas. For example, air, Argon or Krypton or some combination of these three gases could be used. If air is used, then the manufacture of the fenestration unit 18 is simplified, because the desiccant 60 will remove moisture from the space 45 and no steps are necessary to remove the air and replace it with another gas. The description below discusses filling the space 45 with Argon as an example. The description also applies to other gases that may be used.

Filling the space 45 with Argon involves the following steps. First, the sash 19 is constructed with a hole or multiple holes that connect the space 45 to the outside air. An example hole is shown as hole 61. A hose can be inserted into this hole and the air sucked out of the space 45 through the hose. Then Argon can be inserted into the space 45 through the same hose that passes through hole 61. Alternatively, one or more holes 61 may be used to remove the air while Argon is inserted into the space 45 through one or more other holes also similar to hole 61. Other methods of inserting Argon into the space 45 may be used. Once the space 45 is filled with Argon, then the plug 59, shown in exploded view for clarity, is inserted in the hole 61 to seal the space 45. There could be multiple holes 61 and plugs 59 per sash 19. The plug 59 can be maintained in the hole 61 by any method including a friction fit or use of an adhesive.

The second secondary sealant 50 and the second primary sealant 52 may be visible through the second glass pane 21. Therefore, it may be desirable to place a decorative trim piece along the border portion of the second glass pane 21 to hide the sealants from view.

The manufacture of the embodiment shown in FIG. 4 will now be described. First, the sash 19 including the first receiving surface 38 and the second receiving surface 40 is constructed. The construction of the sash 19 includes joining the members 19a-d. Next, the anti-outgassing strip is placed on the interior surface 42, a portion of the first receiving surface 38 and a portion of the second receiving surface 40. As discussed above, the anti-outgassing strip 44 may be attached to the sash 19 by barbs or by an adhesive. A desiccant as described above is then attached to the portion of the anti-outgassing strip 44 that is adjacent to the interior surface 42 of the sash 19. The first secondary sealant 46 is deposited on the portion of the first receiving surface 38 that is not in contact with the anti-outgassing strip 44. The second secondary sealant 50 is deposited on the portion of the second receiving surface 40 that is not in contact with the anti-outgassing strip 44. Next, the first primary sealant 48 is deposited on the first leg 47 of the anti-outgassing strip 44. The second primary sealant 52 is deposited on the second leg 49 of the anti-outgassing strip 44. The next step is to place the border portion 23 of the outside surface 26 of the first glass pane 20 onto the first receiving surface 38 such that the border portion 23 of the outside surface 26 of the first glass pane 20 sits on the first secondary sealant 46 and the first primary sealant 48. There should be a gap between the end 30 and the interior surface 42 of the sash 19. Next, the border portion 25 of the inside surface 34 of the second glass pane 21 is placed on the second receiving surface 40 such that the border portion 25 of the inside surface 34 of the second glass pane 21 sits on the second secondary sealant 50 and the second primary sealant 52. There should be a gap 57 between the end 36 and the flange 58. Finally, the space 45 is filled with a thermally insulating gas through the hole 61 as described above.

Figure 6:
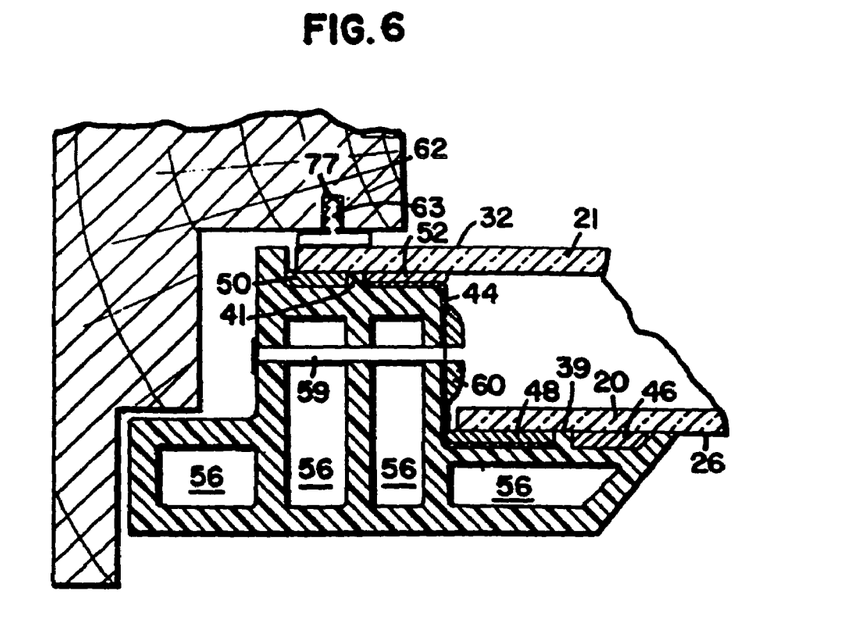
FIG. 6 is a cross-sectional view of the first embodiment of the invention and a window frame in a casement application.

FIG. 6 is similar to FIG. 4 with the addition of a frame 62 that would be used for a casement window. The outside surface 26 of the first glass pane 20 faces the outdoors. The outside surface 32 of the second glass pane 21 faces the indoors.

In FIG. 6, the plug 59 is shown inserted into the sash assembly. A flexible bulbed weatherstop 63 is attached to the frame 62. When the casement window is in a closed position as shown in FIG. 6, the flexible bulbed weatherstop 63 is in contact with the outside surface 32 of the second glass pane 21. The sash 19 may be rotated outward away from the frame 62 as is typical of a casement window. In such a case, the outside surface 32 of the second glass pane 21 moves away from the flexible bulbed weatherstop 63. The purpose of the flexible bulbed weatherstop 63 is to seal the window to prevent water from traveling between the frame 62 and the sash 19 when the window is in its closed position.

The manufacture of the structure shown in FIG. 6 is the same as for the structure shown in FIG. 4 with the additional step of placing the flexible bulbed weatherstop 63 into a groove 77 in the frame 62. The weatherstop 63 is friction fit into the groove 77 so that the weatherstop 63 will not fall out of the groove 77. Alternatively, an adhesive could be placed in the groove 77 to more securely fasten the weatherstop 63 in the groove. The groove 77 is located such that weatherstop 63 is adjacent the second glass pane 21 when the window is in the closed position as shown in FIG. 6.

Figure 7:
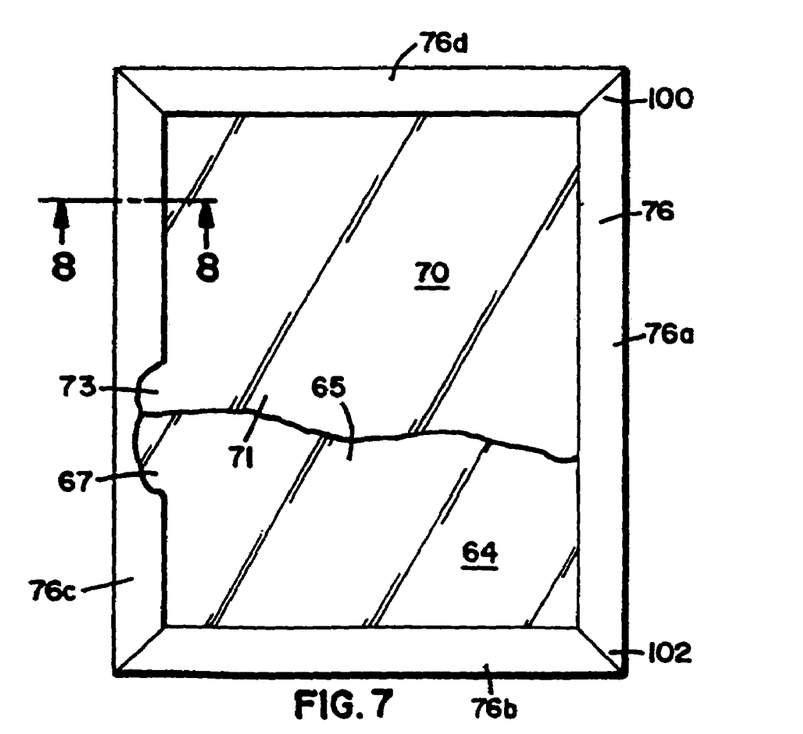
FIG. 7 is a frontal view of the fenestration unit of a second embodiment of the invention including a partial cut-away.

A frontal view of the second embodiment of the invention is shown in FIG. 7. The sash 76 is made of four sash members 76a-d. Each sash member has two ends, for example end 100 and end 102 of sash member 76a. The first glass pane 64 has an inner portion 65 and a border portion 67. The second glass pane 70 has an inner portion 71 and a border portion 73. The inner and border portions in this embodiment are defined the same as with respect to the previous embodiment described above.

Figure 8:
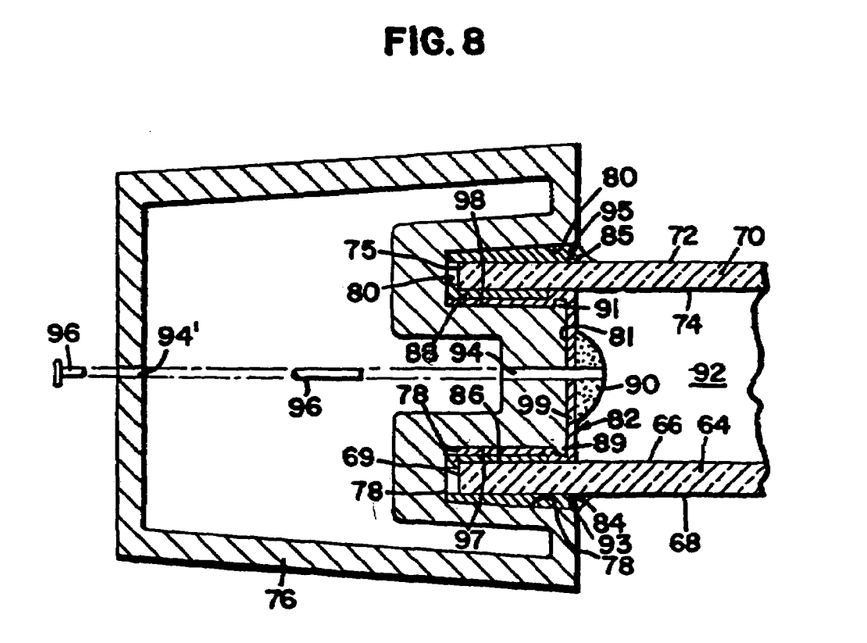
FIG. 8 is a cross-sectional view of the second embodiment of the invention taken along a line 8-8 of FIG. 3.

FIG. 8 is a cross-sectional view taken along the lines 8-8 in FIG. 7. Again, in this embodiment as in the first embodiment discussed above, there is not a separate spacer between the two panes of glass and the glass panes are structurally supported entirely by the sash 76.

The first glass pane 64 has an inside surface 66, an outside surface 68 and a side 69. The second glass pane 70 has an outside surface 72, an inside surface 74 and a side 75. The inside surface 66 of the first glass pane 64 faces the inside surface 74 of the second glass pane 70.

The sash 76 includes a channel having a U-shaped cross-section and a plurality of receiving surfaces 78 that receive the border portion 67 of the inside surface 66 of the first glass pane 64, and the border portion 67 of the outside surface 68 of the first glass pane 64. The channel's receiving surface 78 may also abut against the side 69 of the first glass pane 64.

Moreover, the sash 76 includes a second channel having receiving surfaces 80 that receive the border portion 73 of the inside surface 74 of the second glass pane 70, and the border portion 73 of the outside surface 72 of the second glass pane 70. The second channel's receiving surface 80 may also abut against the side 75 of the second glass pane 70.

Figure 9:
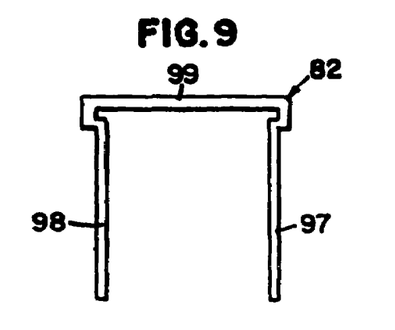
FIG. 9 is a cross-sectional view of the anti-outgassing strip of the second embodiment.

The sash 76 also includes an interior surface 81 which extends between the first and second channels. In this embodiment, the anti-outgassing strip 82 has a U-shaped cross-section, with an interior portion extending between a first leg 97 and a second leg 98. The central portion of the anti-outgassing strip 82 extends across the sash's interior surface 81. Each leg of the strip 82 abuts against the first receiving surface 78 into the second receiving surface 80. The anti-outgassing strip 82 is made of the same material and performs the same function as the anti-outgassing strip 44 of the first embodiment shown in FIG. 4. The anti-outgassing strip 82 may be attached to the sash 76 by an adhesive or by barbs 79. FIG. 9 shows a cross section of the anti-outgassing strip 82 including barbs 79 which are inserted into the sash 76.

The first receiving surface 78 is attached to the border portion 67 of the outside surface 68 of the first glass pane 64 by a adhesive 84. The second receiving surface 80 is attached to the border portion 73 of the outside surface 72 of the second glass pane 70 by a adhesive 85. The adhesives 84 and 85 are the same and perform the same function as the adhesives 46 and 50 of the first embodiment.

The anti-outgassing strip 82 is attached to the border portion 67 of the inside surface 66 of the first glass pane 62 by a sealant 86. The anti-outgassing strip 82 is attached to the border portion 73 of the inside surface 74 of the second glass pane 70 by a sealant 88. The sealants 86 and 88 are the same and perform the same function as the sealants 48 and 52 of the first embodiment.

FIG. 8 also shows the desiccant material 90 attached to the anti-outgassing strip 82 along the interior surface 81 of the sash 76. The purpose and design of the desiccant material 90 is the same as the purpose and design of the desiccant material 60 in the first embodiment of the invention. A desiccant adhesive as described above with respect to the first embodiment may also be used for this embodiment.

Again, with this embodiment as in the first embodiment, either air or Argon or a combination of both may be used to fill the space 92 between the first glass pane 64 and the second glass pane 70. If Argon is used, then a hole 94 may be used to insert a hose for removing air and inserting Argon into the space 92. Once the space 92 is filled or partially filled with Argon, then it may be blocked with a plug 96 which is shown in exploded view for clarity.

The manufacture of the second embodiment involves the following steps. First, the sash members 76a-d are constructed. The sash members can be made from an extruded vinyl or composite or other material, or they can be milled from a wood. Second, the anti-outgassing strip 82 is placed on the interior surface 81 of the sash members 76a-d. The placement of the anti-outgassing strip 82 can either utilize an adhesive or barbs or both. In a preferred embodiment the anti-outgassing strip 82 has a first leg 97, a second leg 98 and an interior portion 99, wherein the interior portion 99 is between the first leg 97 and the second leg 98. The first leg 97 is adjacent to a portion of the first receiving surface 78, the second leg is adjacent to a portion of the second receiving surface 80 and the interior surface 99 of the anti-outgassing strip 82 is adjacent to the interior surface 81 of the sash 76.

The first secondary sealant 84 is deposited on the portion of the first receiving surface that is not in contact with the anti-outgassing strip 82. The first primary sealant 86 is deposited on the first leg 97 of the anti-outgassing strip 82. The second secondary sealant 85 is deposited on the portion of the second receiving surface 80 that is not in contact with the anti-outgassing strip 82. The second primary sealant 88 is deposited on the second leg 98 of the anti-outgassing strip 82. The depositions can be done manually using a caulk gun or automatically with a machine or robot. Then the first glass pane 64 is placed on a platform or support and the second glass pane 70 is suspended parallel and above the first glass pane 64 with the space between the two glass panes being similar or equal to the space 92 desired in the ultimate fenestration unit. For example, suction cups could be applied to the outside surface 72 of the second glass pane 70 to suspend the second glass pane 70 over the first glass pane 64. The sash members 76a-d are then placed around the first and second glass panes 64, 70 such that the first receiving surface 78 receives the border portion of the first glass pane 64 and the second receiving surface 80 receives the border portion of the second glass pane 70. The ends of the sash members 76a-d are then fastened together using heat plates or vibratory welding or any other means of fastening the ends of sash members 76a-d together to form a sash 76. The resulting sash 76 as shown is rectangular in shape, but it could be any shape.

Figure 10:
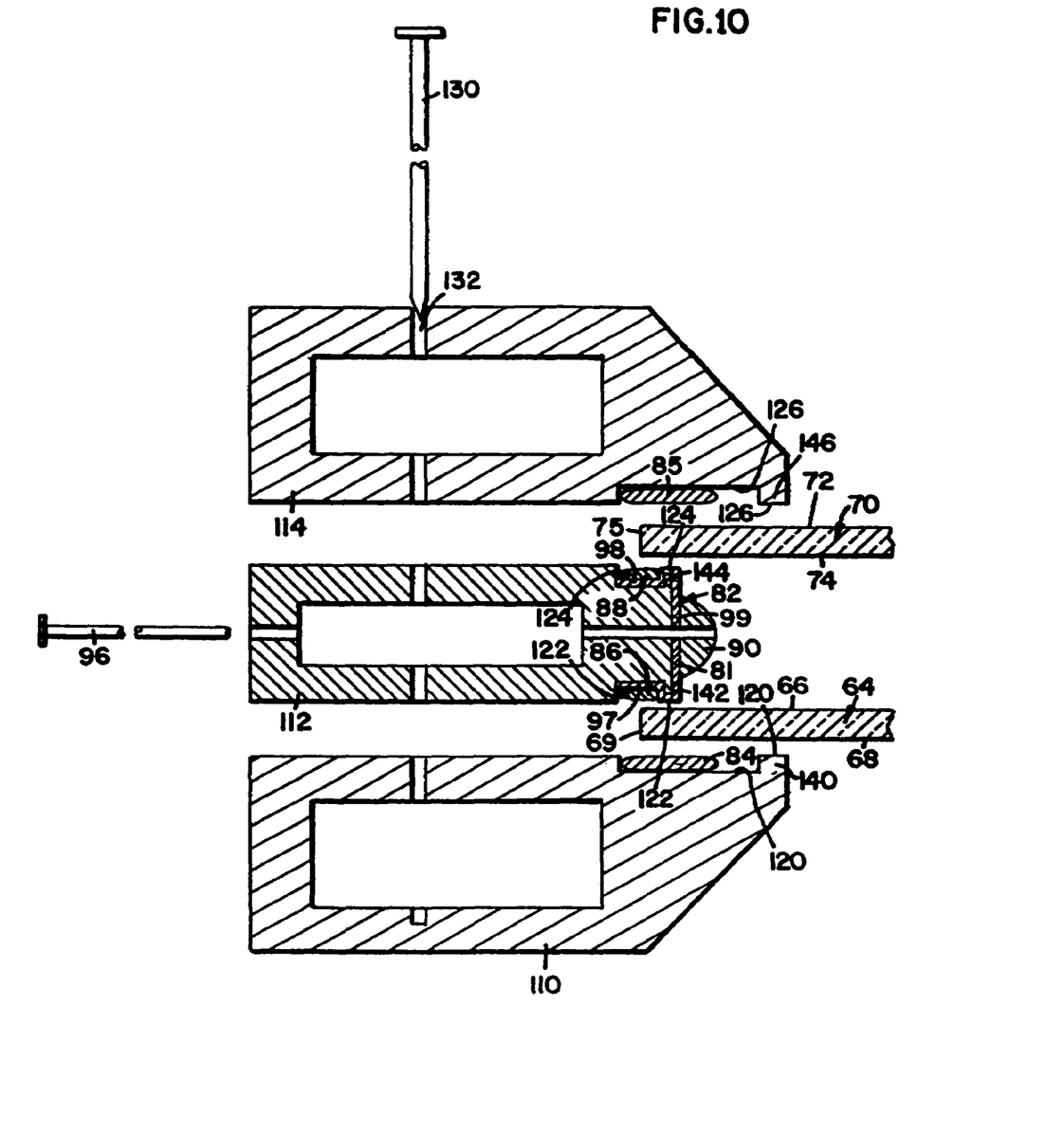
FIG. 10 is a cross-sectional exploded view of a third embodiment of the invention.

A third embodiment of the invention is shown in exploded view in FIG. 10. This embodiment is similar to the second embodiment shown in FIG. 8 with the difference being that the sash in the third embodiment is three sash sections 110, 112 and 114. When the parts are assembled together the first receiving surface 120 of the first sash section 110 is adjacent to the outside surface 68 and a portion of the end 69. The second receiving surface 122 of the second sash section 112 is adjacent to the inside surface 66 and a portion of the end 69. The third receiving surface 124 located on the second sash section 112 is adjacent to the inside surface 74 and a portion of the end 75. The fourth receiving surface 126 of the third sash section 114 is adjacent to a portion of the end 75 and the outside surface 72.

If the sash is rectangular, then there are four first sash sections, four second sash sections and four third sash sections. The advantage of using first, second and third sash sections 110, 112 and 114 is that manufacturing is accomplished in a bed formation in which one layer is placed on top of the other. The manufacturing steps are described below.

First, the three sash sections 110, 112 and 114 are assembled. For a rectangular window, this assembly comprises connecting the four first sash section lineals to each other at the corners to form a rectangular frame. The connection can be by any of the methods described above including hot plate welding, vibratory welding or the use of a mechanical fastener. This rectangular frame is referred to in whole as the first sash section 110. The same assembly process is performed to assemble the second and third sash sections 112 and 114. Next, the anti-outgassing strip 82 is placed on the interior surface 81, on the second receiving surface 122 and on the third receiving surface 124. Then the desiccant material 90 is placed on the interior surface 81 of the second sash section 112.

A first secondary sealant 84 is deposited on the first receiving surface 120. Alternatively, the first secondary sealant 84 can be deposited on the border portion 67 of the outside surface 68 of the first glass pane 64. Then the border portion 67 of the outside surface 68 of the first glass pane 64 is placed on the first receiving surface 120. A first primary sealant 86 is deposited on the portion of the anti-outgassing strip 82 that is adjacent to the second receiving surface 122. Alternatively, the first primary sealant 86 can be deposited on the border portion 73 of the inside surface 66 of the first glass pane 64. Next, the second sash section 112 is lowered onto the first sash section such that the portion of the anti-outgassing strip 82 that is adjacent to the second receiving surface 122 is placed on the border portion 73 of the inside surface 66 of the first glass pane 64. A second primary sealant 88 is deposited on the portion of the anti-outgassing strip 82 that is adjacent to the third receiving surface 124. Alternatively, the second primary sealant 88 may be deposited on the border portion 73 of the inside surface 74 of the second glass pane 70. Then the border portion 73 of the inside surface 74 is placed on the portion of the anti-outgassing strip 82 adjacent to the third receiving surface 124. A second secondary sealant 85 is deposited on the fourth receiving surface 126. Alternatively, the second secondary sealant 85 may be deposited on the border portion 73 of the outside surface 72. The fourth receiving surface 126 is then placed on the border portion 73 of the outside surface 72.

The three sash sections 110, 112 and 114 may be connected together by any method including by an adhesive such as silicone sealant or by use of a fastener. FIG. 10 shows a screw 130 which fits into the hole 132 which extends through the third and second sash sections 114 and 112 and partially into the first sash section 110. A number of such screws 130 would be inserted into a corresponding number of holes 132 around the entire sash to connect all three sash sections together. The end result is that the three sash sections 110, 112 and 114 are connected to form one sash which supports the glass panes.

Figure 11:
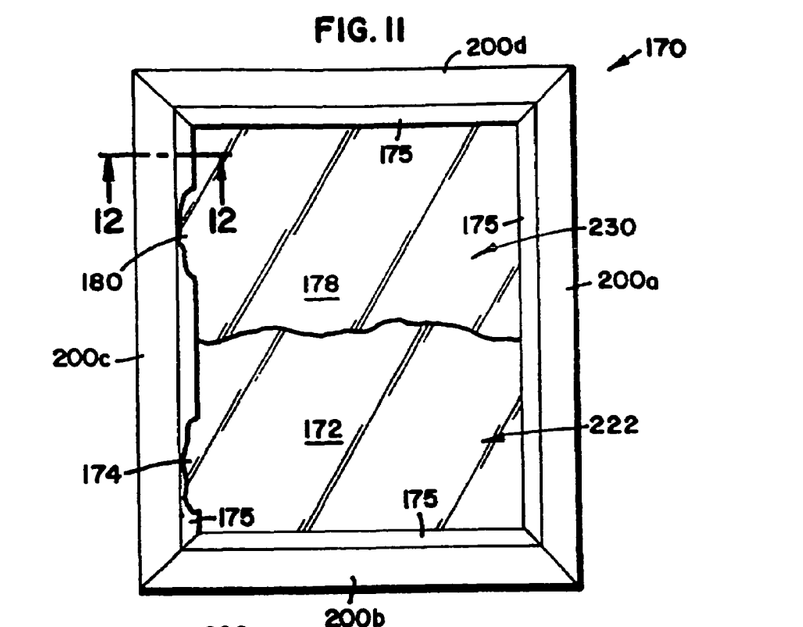
FIG. 11 is a frontal view of the fenestration unit of a fourth embodiment of the invention.
Figure 12:
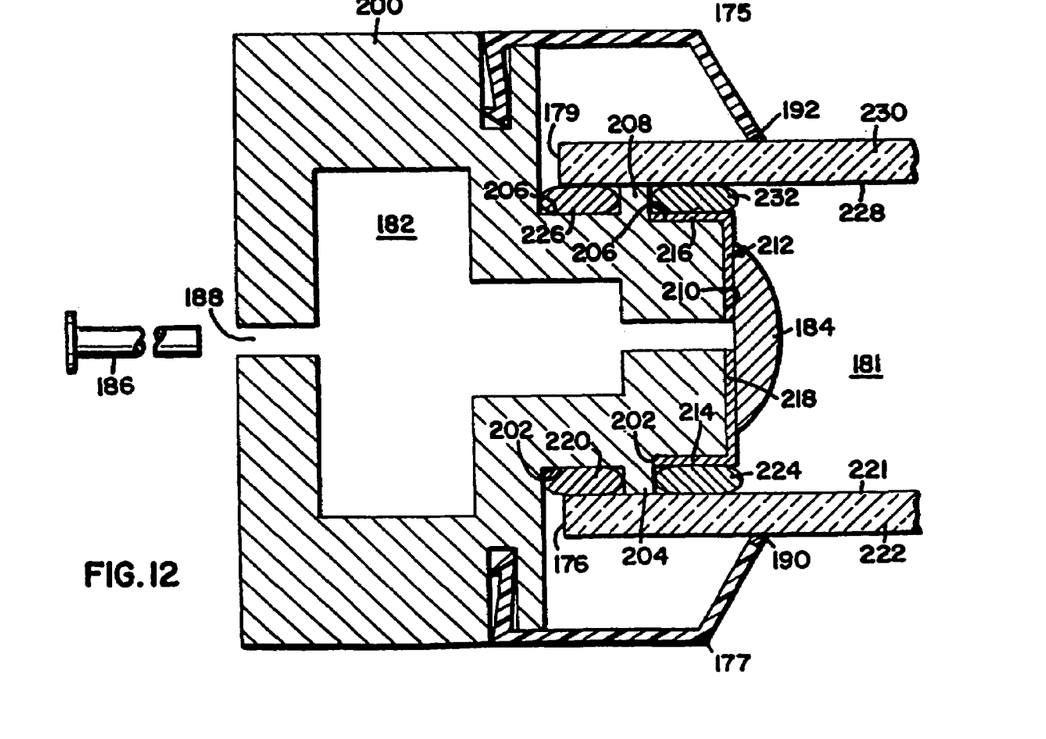
FIG. 12 is a cross-sectional view of a fourth embodiment of the invention taken along the line 12-12 of FIG. 11.

A fourth embodiment of the invention is shown in FIGS. 11-12. FIG. 11 generally illustrates a fenestration unit 170 of the invention. The fenestration unit 170 includes a sash 200 which could also be a window or door frame. The sash 200 includes four sash members 200a, 200b, 200c and 200d and is rectangular in shape. However, the sash members do not have to be lineal and the sash 200 could be any shape. Construction of the sash 200 involves constructing the sash members 200a-d and then fastening the sash members 200a-d together to create the sash 200. The sash members 200a-d can be constructed by extrusion, wood milling or any other suitable manufacturing technique. The four sash members 200a-d can be fastened together in any manner known in the art. For example, depending on the type of material used for the sash 200, the lineal sash members 200a-d could be connected together by an additional piece of connecting hardware, by vibratory welding, by temporary insertion of a heat plate between two adjacent sash members, or by any other method known in the art.

The sash 200 supports the first glass pane 222 and second glass pane 230 creating a space 181 between the glass panes. The first glass pane 222 has an inner portion 172 and a border portion 174. The inner portion 172 and the border portion 174 are defined the same as for the prior embodiments. In a preferred embodiment, the border portion 174 (seen through the cut-away of the upper glazing bead 175) extends from the side 176 of the first glass pane 222 to about one inch from the side 176 in the direction of the inner portion 172 of the first glass pane 222. The second glass pane 230 also has an inner portion 178 and a border portion 180. The inner portion 178 and the border portion 180 are defined the same as above for the first glass pane 222.

FIG. 12 shows a cross sectional view of the fourth embodiment of the invention. The sash 200 is the same material and is constructed in the same manner as the sash 19 described above. The sash 200 has a hollowed portion 182. This hollowed portion is to reduce the weight of the fenestration unit 170. However, the invention is not limited to the particular shape of the hollowed portion 182 shown in FIG. 12 and in fact it is within the scope of this invention to use a solid sash 200 without a hollow portion 182. The sash includes a first receiving surface 202 which is generally flat but including a stop 204 which is portion of the first receiving surface that is raised above the generally flat portion of the first receiving surface 202. The sash 200 also includes a second receiving surface 206 which is generally flat but includes a stop 208. The sash 200 also includes an interior surface 210 which is located between the first receiving surface 202 and the second receiving surface 206.

An anti-outgassing strip 212 which is the same as the anti-outgassing strip 82 is located in contact with the interior surface 210. The anti-outgassing strip includes barbs 213 for attaching to the sash 200. However, as described above, the invention is not limited to the use of barbs for attachment to the sash 200. The anti-outgassing strip 212 includes a first leg 214, a second leg 216 and an interior portion 218. The first leg 214 is in contact with a portion of the first receiving surface 202 as shown in FIG. 12. The second leg 216 is in contact with a portion of the second receiving surface 206 also as shown in FIG. 12. The first leg 214 and the second leg 216 extend up to the respective stops 204 and 208. The interior portion 218 is in contact with the interior surface 210 of the sash 200. The purpose of this anti-outgassing strip 212 is the same as for the first two embodiments of this invention.

A desiccant material 184 is located on the interior surface 218 of the anti-outgassing strip 212. A plug 186 is shown exploded out from the hole 188. The plug 186 fits into the hole 188 and serves the same purpose as the plugs and holes in the earlier described embodiments.

A first secondary sealant 220 is located between the inside surface 221 of the first glass pane 222 and the first receiving surface 202. The first secondary sealant 220 is the same as the first secondary sealant discussed above with respect to the first two embodiments of this invention. A first primary sealant 224 is located between the first leg 214 of the anti-outgassing strip 212 and the first glass pane 222. The first primary sealant 224 is the same as the first primary sealants in the first two embodiments of this invention.

A second secondary sealant 226 is located between the inside surface 228 of the second glass pane 230 and the second receiving surface 206. The second secondary sealant 226 is the same as the first secondary sealant 220. A second primary sealant 232 is located between the second leg 216 of the anti-outgassing strip 212 and the second glass pane 230. The second primary sealant 232 is the same as the first primary sealant 224. The stops 204 and 208 serve the same function as the stop 41 in the first embodiment.

The upper glazing bead 175 is an aesthetic piece which hides the second secondary sealant 226 and the second primary sealant 232 from view of an observer. Likewise, the lower glazing bead 177 hides the first secondary sealant 220 and the first primary sealant 224 from view of an observer. The tips 190 and 192 of the glazing beads 177 and 175 are flexible so that the tips can be pressed tightly against the outside surfaces of the glass panes. The glazing beads 177 and 175 may also apply some pressure to the outside surfaces of the first and second glass panes 222 and 230 respectively. This pressure may assist in holding the glass panes in place while the sealants 220, 224, 226 and 232 are curing.

The manufacturing steps in this fourth embodiment are the same as for the first embodiment with one exception. The first glass pane is positioned on the sash 200 differently in that the border portion 174 of the inside surface 221 of the first glass pane 222 is placed on the first receiving surface 202. The first glass pane 222 may be placed on a support structure to hold the first glass pane in contact with the sealants and the first receiving surface. Such a support could be a table or other structure. Alternatively, a fast curing sealant or hot melt can be used as the first secondary sealant 220 to allow the first glass pane 222 to be quickly adhered to the first receiving surface 202.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A fenestration unit comprising:
  a first glass pane having an inside surface and an outside surface, the inside surface having a border portion and an inner portion and the outside surface having a border portion and an inner portion;
  a second glass pane having an inside surface and an outside surface, the inside surface having a border portion and an inner portion, and the outside surface having a border portion and an inner portion, the inside surface of the first glass pane facing the inside surface of the second glass pane;
  a support structure comprising:
  a first receiving surface for receiving the border portion of the inside surface of the first glass pane, wherein the first glass pane is structurally supported solely at the border portion of the inside surface by the first receiving surface; and
  a second receiving surface for receiving the border portion of the inside surface of the second glass pane; wherein the second glass pane is structurally supported solely at the border portion of the inside surface by the second receiving surface; and
  a vapor barrier extending between and contacting the first receiving surface and the second receiving surface;
  wherein the first receiving surface comprises a first raised portion that contacts the border portion of the inside surface of the first glass pane, and wherein the second receiving surface comprises a second raised portion that contacts the border portion of the inside surface of the second glass pane;
  wherein a first primary sealant is located between the vapor barrier and the inside surface of the first glass pane and wherein a second primary sealant is located between the vapor barrier and the second glass pane;
  wherein the first glass pane is attached to the first receiving surface by a first secondary sealant and the second glass pane is attached to the second receiving surface by a second secondary sealant;
  wherein the first raised portion separates the first primary sealant from the first secondary sealant, and the second raised portion separates the second primary sealant from the second secondary sealant.

2. The fenestration unit of claim 1 wherein the first primary sealant and the second primary sealant each comprise polyisobutylene.

3. The fenestration unit of claim 1 wherein the first and second secondary sealants comprise a silicone material.

4. The fenestration unit of claim 1 wherein the vapor barrier is attached to the support structure by an adhesive.

5. The fenestration unit of claim 1 wherein the vapor barrier comprises a metal.

6. The fenestration unit of claim 1 wherein the vapor barrier is stainless steel.

7. The fenestration unit of claim 1 wherein the vapor barrier is aluminum.

8. The fenestration unit of claim 1 wherein the vapor barrier is a coating applied to the support structure.

9. The fenestration unit of claim 1 wherein the vapor barrier comprises plastic.

10. The fenestration unit of claim 1 wherein the vapor barrier comprises a ceramic material.

11. The fenestration unit of claim 1 wherein the vapor barrier is attached to the first receiving surface and to the second receiving surface and extends therebetween.

12. A fenestration unit comprising:
a first glass pane having an inside surface and an outside surface, the inside surface having a border portion and an inner portion and the outside surface having a border portion and an inner portion;
a second glass pane having an inside surface and an outside surface, the inside surface having a border portion and an inner portion, and the outside surface having a border portion and an inner portion, the inside surface of the first glass pane facing the inside surface of the second glass pane;
a first glazing bead having a flexible tip that presses against the outside surface of the first glass pane and a second glazing bead having a flexible tip that presses against the outside surface of the second glass pane;
a support structure comprising:
a first receiving surface for receiving the border portion of the inside surface of the first glass pane, wherein the first glass pane is structurally supported solely at the border portion of the inside surface by the first receiving surface; and
a second receiving surface for receiving the border portion of the inside surface of the second glass pane; wherein the second glass pane is structurally supported solely at the border portion of the inside surface by the second receiving surface; and
a vapor barrier extending between and contacting the first receiving surface and the second receiving surface;
wherein the first receiving surface comprises a first raised portion that contacts the border portion of the inside surface of the first glass pane, and wherein the second receiving surface comprises a second raised portion that contacts the border portion of the inside surface of the second glass pane.

13. A fenestration unit comprising:
a first glass pane having an inside surface and an outside surface, the inside surface having a border portion and an inner portion and the outside surface having a border portion and an inner portion;
a second glass pane having an inside surface and an outside surface, the inside surface having a border portion and an inner portion, and the outside surface having a border portion and an inner portion, the inside surface of the first glass pane facing the inside surface of the second glass pane;
a support structure comprising:
a first receiving surface for receiving the border portion of the inside surface of the first glass pane, wherein the first glass pane is structurally supported solely at the border portion of the inside surface by the first receiving surface; and
a second receiving surface for receiving the border portion of the inside surface of the second glass pane; wherein the second glass pane is structurally supported solely at the border portion of the inside surface by the second receiving surface; and
a vapor barrier extending between and contacting the first receiving surface and the second receiving surface;
wherein the first receiving surface comprises a first raised portion that contacts the border portion of the inside surface of the first glass pane, and wherein the second receiving surface comprises a second raised portion that contacts the border portion of the inside surface of the second glass pane;
wherein a first primary sealant is located between the vapor barrier and the inside surface of the first glass pane and wherein a second primary sealant is located between the vapor barrier and the second glass pane;
wherein the first glass pane is attached to the first receiving surface by a first secondary sealant and the second glass pane is attached to the second receiving surface by a second secondary sealant;
wherein the fenestration unit further includes a first glazing bead that hides the first primary sealant and the first secondary sealant, and a second glazing bead that hides the second primary sealant and the second secondary sealant.

* * * * *